United States Patent [19]
Imamura et al.

[11] 3,902,542
[45] Sept. 2, 1975

[54] RUBBER ARTICLES REINFORCED WITH HIGH MODULUS FIBER CORDS, AND PNEUMATIC TIRES REINFORCED WITH SUCH FIBER CORDS

[75] Inventors: Takaaki Imamura, Akigawa; Masayuki Matsui, Kodaira; Seisuke Tomita, Higashi-Murayama; Masahiro Makita, Kodaira; Tsunemasa Nakajima, Higashi-Murayama; Koji Chiba, Higashi-Yamato; Nobuyoshi Shimazaki, Kodaira, Japan

[73] Assignee: Bridgestone Tire Company Limited, Tokyo, Japan

[22] Filed: May 31, 1973

[21] Appl. No.: 365,654

[30] Foreign Application Priority Data
June 1, 1972 Japan.............................. 47-53839

[52] U.S. Cl.......... 152/361 R; 152/354; 152/357 R; 152/362 R; 152/361 FP; 152/374
[51] Int. Cl.$^2$... B60C 9/18; B60C 9/02; B60C 13/00
[58] Field of Search........ 152/357, 362 R, 374, 352, 152/353 R, 361 R, 361 FP, 354, 357 R

[56] References Cited
UNITED STATES PATENTS

| | | | |
|---|---|---|---|
| 3,083,749 | 4/1963 | Destinay et al. | 152/361 R |
| 3,253,636 | 5/1966 | Travers | 152/362 R |
| 3,392,773 | 7/1968 | Warren et al. | 152/362 R |
| 3,500,890 | 3/1970 | Boileau | 152/361 FP |
| 3,512,568 | 5/1970 | DeLobelle | 152/361 R |
| 3,598,165 | 8/1971 | Hanus | 152/361 R |
| 3,613,763 | 10/1971 | Fletcher | 152/361 FP |
| 3,709,277 | 1/1973 | Montagne | 152/374 |
| 3,853,163 | 12/1974 | Mezzanotte et al. | 152/353 R |

*Primary Examiner*—Drayton E. Hoffman
*Attorney, Agent, or Firm*—Sughrue, Rothwell, Mion, Zinn & Macpeak

[57] ABSTRACT

Rubber articles reinforced with high modulus fiber cords are produced by covering at least an end portion of the fiber cord with a hard rubber layer and further covering said hard rubber layer with a soft rubber layer. By such means, a highly reinforced pneumatic tire can be manufactured.

13 Claims, 6 Drawing Figures

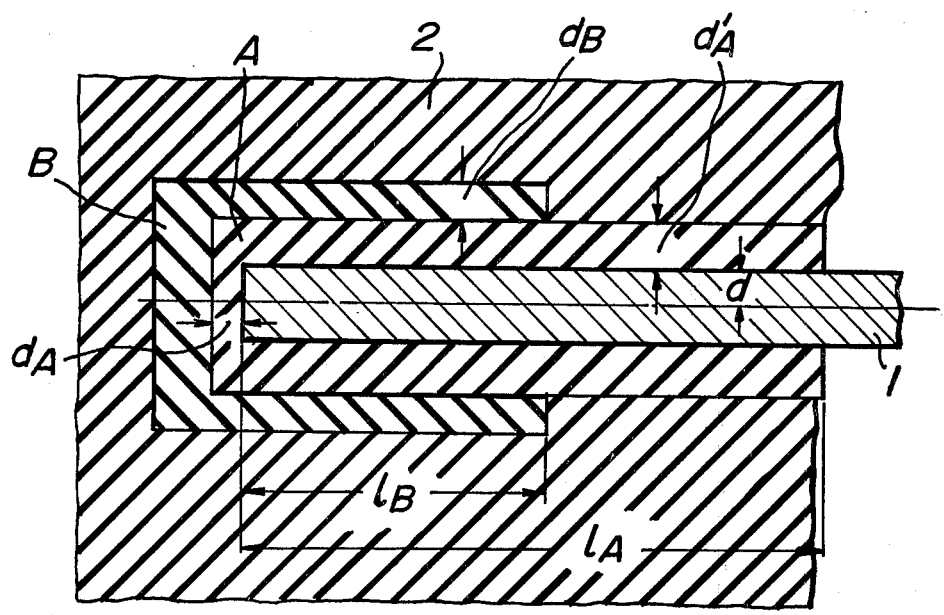
FIG_1

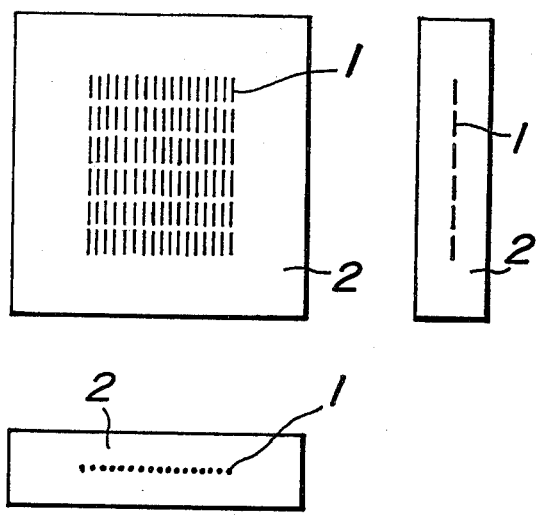
FIG_2

FIG_3
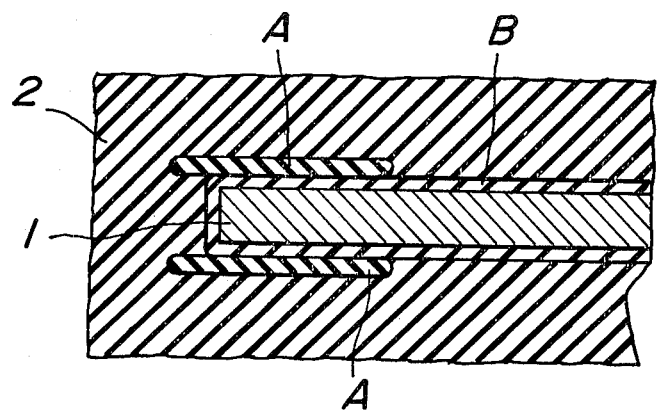
FIG_4
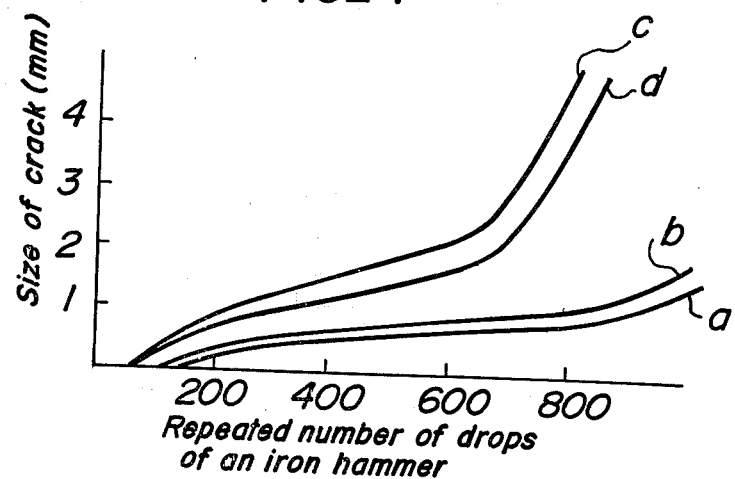

FIG_5
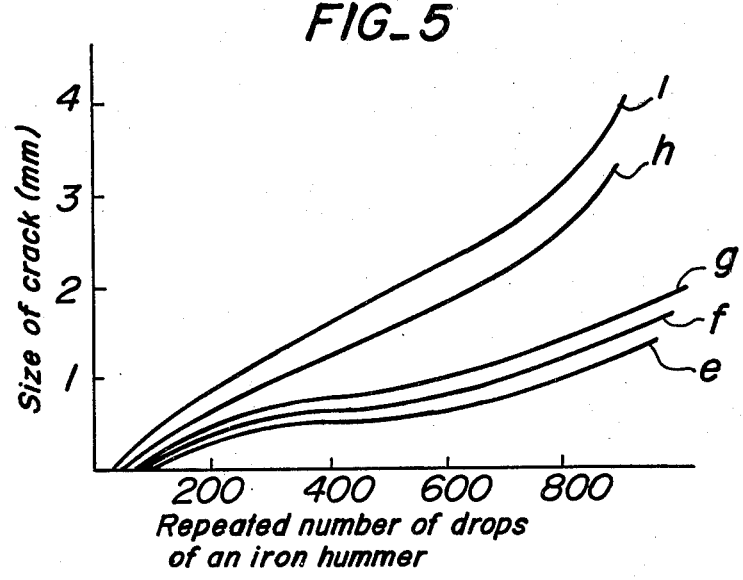
FIG_6
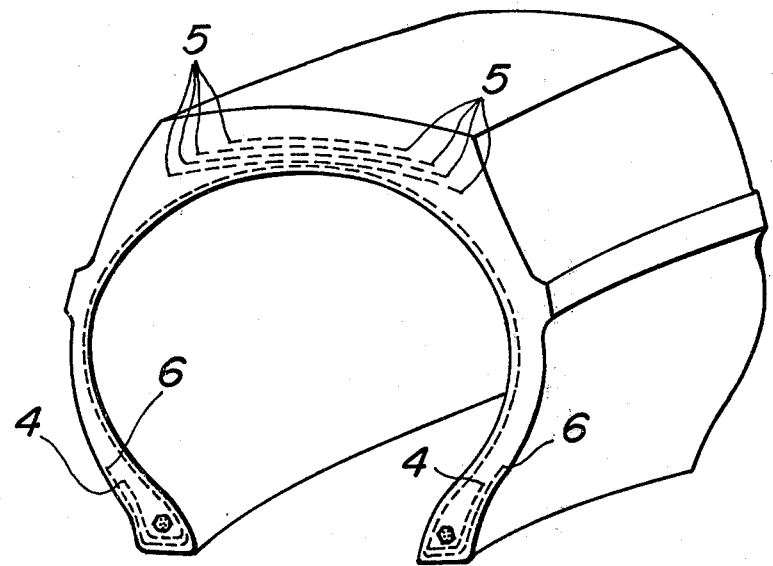

RUBBER ARTICLES REINFORCED WITH HIGH MODULUS FIBER CORDS, AND PNEUMATIC TIRES REINFORCED WITH SUCH FIBER CORDS

The present invention relates to rubber articles reinforced with high modulus fiber cords and particularly to rubber articles reinforced with high modulus fiber cords for obtaining tires having an improved durability at the breaker or bead section of a pneumatic tire and to a method for producing said rubber articles. The term "end of high modulus fiber cord" used herein means the cut end formed when the high modulus fiber cord coated with rubber is cut in a desired length in the usual production of tire. Recently, as cars have become a larger size and speeds have increased and the high speed durability, stability and safety requirements have been met by a radial ply tire and a belted bias tire in which high modulus fiber cords are used in the breaker, carcass or chaffer.

However, when high modulus fiber cords are used for the breaker, carcass or chaffer, an outer strain due to the charge of air pressure or running concentrates excessively at the ends of high modulus fiber cords causing cracks in the rubber in the vicinity of the ends of the high modulus fiber cords. In the breaker section, a breaker end separation occurs and in the bead section, a ply end separation or wire chaffer end separation occurs (these breakdowns are referred to as merely end separation hereinafter) and the tires are broken.

Previously, methods for preventing breakdown at the folded ply end, chaffer end or breaker end have been proposed in Japanese Pat. No. 238,506, British Pat. No. 753,963 and U.S. Pat. No. 3,111,976 and the like. However, the above described breakdown has not been obviated satisfactorily by these proposals.

An object of the present invention is to provide rubber articles in which the ends of the high modulus fiber cords in the rubber articles are improved in the reinforcement.

Another object of the present invention is to provide pneumatic tires in which the durability at the breaker section and the bead section is improved.

The inventors have studied the above described objects and found that they can be accomplished by arranging a hard rubber and a soft rubber so as to cover the high modulus fiber cords with the hard rubber directly applied to the cords and to cover the hard rubber with the soft rubber.

Namely, the present invention consists in reinforced rubber articles characterized in that at least one end of the high modulus fiber cords is covered directly with a rubber layer compounded in a usual manner so as to adhere the rubber satisfactorily to the high modulus fiber cords and at least the end of the high modulus fiber cord is further covered with a rubber layer having a Young's modulus of 20–90% of the Young's modulus of the former rubber layer to arrange the latter rubber layer at the outside of the former rubber layer.

The term "high modulus fiber" according to the present invention means wire and glass fibers having a Young's modulus of not less than $4.0 \times 10^5$ Kg/cm².

The arrangement of the hard rubber layer A and the soft rubber layer B in the present invention is shown in FIG. 1. That is, the structure is constructed with the high modulus fiber cord 1, the surrounding rubber 2, the hard rubber layer A and the soft rubber layer B.

The thickness of the rubber layer A is preferably 1/5–3 times of the radius of the high modulus fiber cord and more preferably ½–2 times. The rubber layer A usually covers the whole surface of the high modulus fiber cord directly and the covering length $l_A$ in FIG. 1 must be not less than 5 mm, preferably not less than 10 mm. Since the rubber layer A covers the high modulus fiber cord directly, said rubber layer preferably compound includes a having a high adhesion to the fiber cord. For example, when the high modulus fiber cord is a steel cord, a rubber compound containing a cobalt salt, such as cobalt naphthenate as an additive is preferred because of a high adhesion.

The thickness of the rubber layer B is preferred to be 0.3–5 mm, more preferably, 0.5–3 mm. The covering length $l_B$ in the longitudinal direction from the end of the high modulus fiber cord is preferably not less than 2 mm, more preferably not less than 5 mm.

Furthermore, the thickness of the rubber layer has a relation to the rubber Young's modulus. That is, when the Young's modulus of the rubber in the rubber layer B is very much smaller than that of the rubber in the rubber layer A, the thickness of the rubber layer B may be relatively thin, while when the difference of the Young's modulus of the rubber in the rubber layer A from that of the rubber in the rubber layer B is small, unless the thickness of the rubber layer B is increased, the stress concentration or the strain concentration in the cord end can not be satisfactorily reduced.

The most appropriate combination of Young's modulus of rubbers is that the Young's modulus of the rubber in the rubber layer B is 20–90% of the Young's modulus of the rubber in the rubber layer A, preferably 30–60%. Furthermore, the rubbers in both the layers have preferably a Young's modulus of at least 10 Kg/cm² and more preferably, the rubber in the rubber layer A has a Young's modulus of 70–220 Kg/cm².

As the rubbers in the rubber layer A and the rubber layer B, use is made of a rubber compound consisting mainly of natural rubber or synthetic polyisoprene rubber which has an excellent processability and adhesion in the step for producing tires and has high fatigue resistance and tensile properties, or the mixture thereof. The rubber in the rubber layer A has preferably a stress-strain product of not less than $3.0 \times 10^4$ %·Kg/cm² and the rubber in the rubber layer B has preferably a stress-strain product of not less than $5.0 \times 10^4$ %·Kg/cm². As the high modulus fiber cords to be used in the pneumatic tires of the present invention, steel cords obtained by cold drawing iron steel, applying brass plating and then twisting the resulting steel wires are preferable in view of durability, safety, low heat evolution and cost.

In the drawing, only the cord having a cut end surface perpendicular to the axial direction of the cord was exemplified but the end may be an inclined cut surface or the twisted fibers at the end may be unfastened. Moreover, when the input is applied in a bias direction against the center axis of the cord, the object can be attained by reinforcing only the side face of the cord with the process according to the present invention.

The reinforcing process of the present invention has a noticeable effect compared with the conventional technic and the pneumatic tire obtained by the reinforcing process of the present invention shows a remarkable improvement in the durability and the effect will be explained in the following examples in detail.

For a better understanding of the invention, reference is taken to the accompanying drawings, wherein:

FIG. 1 is a cross-sectional view of a rubber article sample or a tire containing the end of high modulus fiber cord reinforced by the method of the present invention;

FIG. 2 shows a front view, a plan view and a side view of a rubber article sample embedded reinforcing high modulus fiber cords;

FIG. 3 is a cross-sectional view of a rubber article sample containing the end of high modulus fiber cords reinforced by a conventional method;

FIG. 4 is a graph showing a relation between the repeated number of drops of an iron hammer and the size of crack formed at the end of high modulus fiber cords in the test of Example 1;

FIG. 5 is a graph showing the same relation in the test of Example 2; and

FIG. 6 is perspective view showing a cross-section of a tire corresponding to Examples 3, 4 and 5.

The following examples are given for the purpose of illustration of this invention and are not intended as limitations thereof.

EXAMPLE 1

Steel cords 1 having a structure of 1×3+6 and having a length of 60 mm and a radius of 0.6 mm were embedded in rubber 2 having a length of 100 mm, a width of 100 mm and a thickness of 24 mm at a count of 17 cords/5 cm to prepare four rubber article samples $(a)$–$(d)$ as shown in FIG. 2. An iron hammer having a load of 50 Kg was dropped repeatedly on the sample from a height of 12 cm by the action of gravity at a rate of one drop per one second so as to apply a shear strain along the longitudinal direction of the steel cords 1, whereby a 40% compression strain was applied to the sample in its thickness direction, and a relation between the repeated number of drops of the hammer and the size of crack formed was measured to obtain a result as shown in FIG. 4.

The above prepared four rubber article samples $(a)$–$(d)$ were as follows.

Sample $(a)$: a sample according to the present invention having reinforced steel cords as shown in FIG. 1. In FIG. 1, the hard rubber layer A directly covers the whole surface of the steel cords 1 in such a manner that the thickness $d_A$ at the cut surface of the steel cords is 0.2–0.4 mm (⅓–⅔ times the radius of the steel cord) and the thickness $c_A'$ at the other portion is 0.7–1.0 mm (7/6–5/3 times the radius of the steel cord) and further the soft rubber layer B covers the hard rubber layer A at the cord end portion in such a manner that the thickness $d_B$ is 1 mm and the length $l_B$ from the cord end is 10 mm.

Sample $(b)$: a sample according to the present invention having reinforced steel cords as shown in FIG. 1. In FIG. 1, the covering by the hard rubber layer A is the same as that in the sample $(a)$ and the soft rubber layer B covers the hard rubber layer A at the cord end portion in such a manner that the thickness $d_B$ is 3 mm and the length $l_B$ from the cord end is 2 mm.

Sample $(c)$: a conventional sample having no reinforced steel cords.

Sample $(d)$: a comparative sample as shown in FIG. 3, in which the hard rubber layer A is arranged outside the soft rubber layer B, and the hard rubber layer A does not cover the cut surface portion of steel cords.

As seen from FIG. 4, the size of crack and the developing velocity of crack, i.e., the ratio of the size of crack to the repeated number of drops of the iron hammer in the samples $(a)$ and $(b)$ having reinforced steel cords according to the present invention are smaller than these in the samples $(c)$ and $(d)$.

The compounding recipes and the properties of rubbers used in Example 1 were as follows.

Compounding recipe

| Rubber layer | 2 (surrounding rubber) | A | B |
|---|---|---|---|
| Natural rubber RSS No. 1 | 100 | 100 | 100 |
| Carbon black HAF | 45 | 50 | 30 |
| Zinc oxide | 7 | 7 | 7 |
| Sulfur | 3 | 3 | 3 |
| N-cyclohexylbenzothiazole sulfenamide | 0.5 | 0.5 | 0.5 |
| Phenyl-β-naphthylamine | 1 | 1 | 1 |
| Alkylphenol resin | 5 | 5 | 5 |
| Cobalt naphthenate | 3 | 3 | 3 |

Property

| Rubber layer | A | B |
|---|---|---|
| Young's modulus ($Kg/cm^2$) | 100 | 35 |
| Stress-strain product ($\% \cdot Kg/cm^2$) | $7.6 \times 10^4$ | $8.4 \times 10^4$ |

The Young's modulus and the stress-strain product were determined as follows. A stringy rubber sample is taken out from the corresponding rubber layer and the Young's modulus and the stress-strain product of the stringy rubber sample are measured by means of a tensile tester having a load-detecting sensitivity of 1 g.

When each of the rubber article samples $(a)$–$(d)$ was ground to expose the corresponding rubber layer, and the international hardness (IRHD) of the rubber was measured by means of a commercially available mirco-hardness tester and the obtained IRHD value was calculated into Young's modulus by an ordinarily known method, the obtained Young's modulus was the same as the Young's modulus measured by means of a tensile tester.

Further, the above described test, which was effected by using steel cords having a structure of 1×3+5×7+1 or 7×4 instead of the above described steel cord, also showed that the reinforcement according to the present invention is effective for the improvement of the life of rubber articles.

EXAMPLE 2

The following rubbers A and B were used in place of the hard rubber layer A and the soft rubber layer B, respectively, of the rubber article sample $(a)$ in Example 1 to prepare rubber article samples $(e)$–$(i)$, and the same test as described in Example 1 was effected.

| Sample No. | Rubber layer A | | Rubber layer B | |
|---|---|---|---|---|
| | Young's modulus ($Kg/cm^2$) | Stress-strain product ($\% \cdot Kg/cm^2$) | Young's modulus ($Kg/cm^2$) | Stress-strain product ($\% \cdot Kg/cm^2$) |
| e | 102 | $7.6 \times 10^4$ | 35 | $8.5 \times 10^4$ |

-Continued

| Sample No. | Rubber layer A | | Rubber layer B | |
|---|---|---|---|---|
| | Young's modulus (Kg/cm²) | Stress-strain product (%·Kg/cm²) | Young's modulus (Kg/cm²) | Stress-strain product (%·Kg/cm²) |
| f | 155 | 7.5×10⁴ | 62 | 8.2×10⁴ |
| g | 220 | 7.1×10⁴ | 103 | 7.6×10⁴ |
| h | 53 | 8.4×10⁴ | 104 | 7.6×10⁴ |
| i | 310 | 7.0×10⁴ | 32 | 8.8×10⁴ |

FIG. 5 shows the result of the test in this Example 2. As seen from FIG. 5, the size of crack and the developing velocity of crack, i.e., the ratio of the size of crack to the repeated number of drops of the hammer in the samples ($e$), ($f$) and ($g$) are smaller than those in the samples ($h$) and ($i$). In the sample ($h$), the Young's modulus of the rubber layer A is too low and further the hard rubber layer is arranged outside the soft rubber layer. In the sample ($i$), the Young's modulus of the hard rubber layer A is too high, and that of the soft rubber layer B is too low.

EXAMPLE 3

When a radial ply tire 10.00-20 for truck and bus as shown in FIG. 6, in which steel cords having a structure of 1×3+5×7+1 and having a radius of 0.86 mm were used as a ply cord, was produced in a conventional manner, the end 4 of the folded ply was reinforced according to the present invention.

In this Example 3, the end 4 of the folded ply was reinforced as shown in FIG. 1. In FIG. 1, the rubber layer A directly covers the whole surface of the steel cords 1 in such a manner that the thickness $d_A$ at the cut surface of the steel cords is 0.2 mm (0.23 time of the steel cord radius) and the thickness $d_A'$ at the other portion is 0.6 mm (0.70 time of the steel cord radius) and further the rubber layer B covers the rubber layer A at the cord end portion in such a manner that the thickness $d_B$ is 2 mm and the length $l_B$ from the cord end is 15 mm. The rubbers used in the rubber layers A and B were rubber compounds consisting mainly of natural rubber and had the following properties.

| Rubber layer | A | B |
|---|---|---|
| Young's modulus (Kg/cm²) | 100 | 35 |
| Stress-strain product (%·Kg/cm²) | 7.6×10⁴ | 8.4×10⁴ |

When the tire of this Example 3 and the conventional tire having no reinforced steel cords in the ply were tested simultaneously under a low inner pressure and a high load by means of a conventional drum tester, it was found that the end separation life of the folded ply in the tire of this Example 3 was more than 250% based on the end separation life of the folded ply in the conventional tire having no reinforced steel cords.

EXAMPLE 4

When a radial ply tire 10.00-20 for truck and bus as shown in FIG. 6, which had a breaker assembly composed of four laminated breaker layers formed in such a manner that steel cords having a structure of 1×3+6 and having a radius of 0.6 mm were arranged in parallel, the steel cords were covered with the rubber layer A in a thickness $d_A'$ of 0.57 mm (0.95 time of the steel cord radius) to form a sheet, the sheet was cut at angles of 70°, 70°, 70° and 23° against the latitudinal direction of the steel cords into four layers, and the four layers were laminated successively, was produced in a conventional manner, the end 5 of the steel cords at the breaker end was reinforced according to the present invention.

In this Example 4, the end 5 of the steel cords 1 at the breaker end was reinforced as shown in FIG. 1. In FIG. 1, the rubber layer A directly covers the whole surface of the steel cords 1 in such a manner that the thickness $d_A$ at the cut surface of the steel cords is 0.15–0.20 mm (¼–⅓ time of the steel cord radius) and the thickness $d_A'$ at the other portion is 0.57 mm and further the rubber layer B covers the rubber A at the cord end portion in such a manner that the thickness $d_B$ is 2 mm and the length $l_B$ from the cord end is 15 mm.

The rubbers used in the rubber layers A and B were rubber compounds consisting mainly of natural rubber and had the following properties.

| Rubber layer | A | B |
|---|---|---|
| Young's modulus (Kg/cm²) | 100 | 35 |
| Stress-strain product (%·Kg/cm²) | 7.6×10⁴ | 8.4×10⁴ |

When the tire of this Example 4 and the conventional tire having no reinforced steel cords in the breaker were tested simultaneously under the usual testing condition by means of a conventional drum tester, it was found that the end separation life of the former tire was 30% longer than that of the latter tire.

EXAMPLE 5

When a radial ply tire 10.00-20 for truck and bus as shown in FIG. 6, in which a layer obtained by arranging steel cords having a structure of 1×3+9+9×3+1 and having a radius of 0.6 mm in parallel was used as a chaffer, is produced in a conventional manner, the end 6 of the steel cords at the chaffer end was reinforced according to the present invention.

In this Example 5, the end 6 of the steel cords 1 at the chaffer end was reinforced as shown in FIG. 1. In FIG. 1, the rubber layer A directly covers the whole surface of the steel cords 1 in such a manner that the thickness $d_A$ at the cut surface of the steel cords is 0.15–0.20 mm (¼–⅓ time of the steel cord radius) and the thickness $d_A'$ at the other portion is 0.6 mm (same as the steel cord radius) and further the rubber layer B covers the rubber layer A at the cord end portion in such a manner that the thickness $d_B$ is 2 mm and the length $l_B$ from the cord end is 15 mm.

The rubbers used in the rubber layers A and B were rubber compounds consisting mainly of natural rubber and had the following properties.

| Rubber layer | A | B |
|---|---|---|
| Young's modulus (Kg/cm²) | 100 | 40 |
| Stress-strain product (%·Kg/cm²) | 7.0×10⁴ | 8.0×10⁴ |

When the tire of this Example 5 and the conventional tire having no reinforced steel cords in the chaffer were tested simultaneously under a drum test condition of a low inner pressure and a high load by means of a conventional drum tester, the end separation life of the former tire was 250% based on the end separation life of the latter tire.

What is claimed is:

1. Rubber articles reinforced with high modulus fiber cords having a Young's modulus of not less than $4.0 \times 10^5$ Kg./cm$^2$ comprising a rubber layer A having a Young's modulus of 70–220 Kg/cm$^2$ and compounded in the usual manner so as to provide a satisfactory adhesion to said fiber cord, which covers an end surface and at least a part of peripheral surface of said fiber cord along the cord axis from the fiber cord end directly and a rubber layer B having a Young's modulus of 20–90% of the Young's modulus of said rubber layer A, which covers at least the end of said fiber cord and is arranged in a layer form in contact with the outside of the rubber layer A, wherein said rubber layer B covers said rubber layer A in a thickness of 0.3–5 mm and the covering length along the cord axis from the end is not less than 2 mm.

2. Rubber articles as claimed in claim 1, wherein said high modulus fiber cord is a metal steel cord.

3. Rubber articles as claimed in claim 1, wherein said rubber layer A covers said high modulus fiber cord in a thickness of 1/5–3 times the radius of said fiber cord and the covering length along the cord axis from the end is not less than 5 mm.

4. Rubber articles as claimed in claim 1, wherein said high modulus fiber cord is a glass fiber cord.

5. Pneumatic tires reinforced with high modulus fiber cords having a Young's modulus of not less than $4.0 \times 10^5$ Kg/cm$^2$, in which a rubber layer A having a Young's modulus of 70–220 Kg/cm$^2$ and a stress-strain product of not less than $3.0 \times 10^4$ %·Kg/cm$^2$ and compounded in the usual manner so as to provide a satisfactory adhesion to said fiber cord, covers at least an end of said fiber cord directly and a rubber layer B having a Young's modulus of 20–90% of the Young's modulus of said rubber layer A and a stress-strain product of not less than $5.0 \times 10^4$ %·Kg/cm$^2$ covers at least the end of the fiber cord and is arranged in a layer form in contact with the outside of said rubber layer A, wherein said rubber layer B has a thickness of 0.3–5 mm and a covering length of not less than 2 mm.

6. Pneumatic tires as claimed in claim 5, wherein said high modulus fiber cord is a steel cord.

7. Pneumatic tires as claimed in claim 5, wherein said high modulus fiber cord is used for a carcass.

8. Pneumatic tires as claimed in claim 5, wherein said high modulus fiber cord is used for a chaffer.

9. Pneumatic tires as claimed in claim 5, wherein said high modulus fiber cord is used for a breaker.

10. Pneumatic tires as claimed in claim 5, wherein said rubber layer A and said rubber layer B are rubber compounds of natural rubber.

11. Pneumatic tires as claimed in claim 5, wherein said rubber layer A has a thickness of 1/5–3 times the radius of said high modulus fiber cord and a covering length of not less than 5 mm.

12. Pneumatic tires as claimed in claim 5, wherein said rubber layer A and said rubber layer B are synthetic rubber compounds.

13. Pneumatic tires as claimed in claim 5, wherein said rubber layer A and said rubber layer B are rubber compounds of a mixture of natural and synthetic rubber.

* * * * *